US011403568B2

(12) United States Patent
Attenberg et al.

(10) Patent No.: US 11,403,568 B2
(45) Date of Patent: Aug. 2, 2022

(54) METHODS, SYSTEMS, AND MEDIA FOR PROVIDING DIRECT AND HYBRID DATA ACQUISITION APPROACHES

(75) Inventors: Joshua M Attenberg, Roxbury, CT (US); Foster J Provost, New York, NY (US)

(73) Assignee: Integral Ad Science, Inc., New York, NY (US)

( * ) Notice: Subject to any disclaimer, the term of this patent is extended or adjusted under 35 U.S.C. 154(b) by 0 days.

(21) Appl. No.: 12/986,108

(22) Filed: Jan. 6, 2011

(65) Prior Publication Data

US 2011/0173037 A1 Jul. 14, 2011

Related U.S. Application Data

(60) Provisional application No. 61/349,537, filed on May 28, 2010, provisional application No. 61/292,883, (Continued)

(51) Int. Cl.
*G06Q 10/06* (2012.01)
*G06Q 30/02* (2012.01)
*G06N 20/00* (2019.01)

(52) U.S. Cl.
CPC ........... *G06Q 10/063* (2013.01); *G06N 20/00* (2019.01); *G06Q 30/02* (2013.01)

(58) Field of Classification Search
CPC ............... G06Q 30/02; G06Q 30/0269; G06Q 30/02375; G06Q 30/0202;
(Continued)

(56) References Cited

U.S. PATENT DOCUMENTS 6,212,526 B1 * 4/2001 Chaudhuri ........ G06F 17/30598
6,513,025 B1 * 1/2003 Rosen .................... G06N 5/025
706/12
(Continued)

OTHER PUBLICATIONS

AdSafe Media, "About Us", last accessed Oct. 10, 2012, pp. 1-4, available at: http://adsafemedia.com/about-adsafe.
(Continued)

*Primary Examiner* — Mehmet Yesildag
*Assistant Examiner* — Ayanna Minor
(74) *Attorney, Agent, or Firm* — Byrne Poh LLP

(57) ABSTRACT

Methods, systems, and media for providing direct and hybrid data acquisition approaches are provided. In accordance with some embodiments of the disclosed subject matter, a method of data acquisition for construction of classification models that incorporates multiple human reviewing resources is provided, the method comprising: receiving a cost structure for constructing a classification model using a data set; instructing human reviewing resources to search through the data set and select instances of a class that satisfy a criterion, providing the human reviewing resources with a definition of the class; training the classification model with the instances from the human reviewing resources; determining when an expected gain for performing additional searches by the human reviewing resources as a function of the cost structure is lower than a given threshold; and, instructing the human reviewing resources searching through the set to label one or more examples from the data set.

11 Claims, 9 Drawing Sheets

Related U.S. Application Data filed on Jan. 7, 2010, provisional application No. 61/292,718, filed on Jan. 6, 2010.

(58) Field of Classification Search
CPC ............. G06Q 10/06375; G06Q 10/00; G05D 1/0088; G06H 99/005; G06F 17/30; G06K 9/00523; G06N 20/00
USPC ....... 701/408; 705/7.26; 725/34; 706/12, 45, 706/7.26; 707/737; 709/239; 717/120

See application file for complete search history.

(56) References Cited

U.S. PATENT DOCUMENTS

| | | | | |
|---|---|---|---|---|
| 6,662,357 | B1* | 12/2003 | Bowman-Amuah | G06F 8/20 717/120 |
| 7,500,014 | B1* | 3/2009 | Jacobson | H04L 41/0677 709/239 |
| 7,835,910 | B1* | 11/2010 | Hakkani-Tur | G10L 15/063 704/243 |
| 7,899,694 | B1 | 3/2011 | Marshall et al. | |
| 8,214,364 | B2* | 7/2012 | Bigus | G06F 21/552 707/737 |
| 2002/0083067 | A1* | 6/2002 | Tamayo et al. | 707/100 |
| 2003/0101451 | A1* | 5/2003 | Bentolila et al. | 725/34 |
| 2003/0212691 | A1* | 11/2003 | Kuntala | G06F 17/30539 |
| 2003/0229635 | A1* | 12/2003 | Chaudhuri et al. | 707/6 |
| 2004/0143477 | A1* | 7/2004 | Wolff | G06Q 10/06316 705/7.26 |
| 2005/0210065 | A1* | 9/2005 | Nigam | G06F 16/35 |
| 2008/0133126 | A1* | 6/2008 | Dupray | 701/204 |
| 2009/0157572 | A1* | 6/2009 | Chidlovskii | G06N 99/005 706/12 |
| 2010/0250307 | A1* | 9/2010 | Hollas | 705/7 |
| 2010/0312725 | A1* | 12/2010 | Privault | G06Q 10/10 706/12 |
| 2010/0332281 | A1* | 12/2010 | Horvitz | G06Q 10/06311 705/7.13 |
| 2011/0047006 | A1 | 2/2011 | Attenberg et al. | |

OTHER PUBLICATIONS

Amazon, "Mechanical Turk", last accessed May 16, 2016, pp. 1, available at: https://www.mturk.com/mturk/welcome.

Asuncion, A. and Newman, D., "UCI Machine Learning Repository", last accessed May 12, 2016, pp. 1-3, available at: archive.ics.uci.edu/ml/.

Attenberg, J. and Provost, F., "Toward Optimal Allocation of Human Resources for Active Learning with Application to Safe On-Line Advertising", Technical Report, Stern Working Paper Ceder-09-07, Dec. 2009, pp. 1-9.

Baram, Y. et al., "Online Choice of Active Learning Algorithms", In the Journal of Machine Learning Resarch, vol. 5, Mar. 2004, pp. 255-291.

Bloodgood, M. and Shanker, K.V., "Taking into Account the Differences Between Actively and Passively Acquired Data: The Case of Active Learning with Support Vector Machines for Imbalanced Datasets", In Proceedings of NAACL, Boulder, CO, US, May 31-Jun. 5, 2009, pp. 137-140.

Chawla, N.V. et al., "SMOTE: Synthetic Minority Over-Sampling Technique", In Journal of Artificial Intelligence Research, vol. 16, Jun. 2002, pp. 321-357.

Cohn, D. et al., "Improving Generalization with Active Learning", In Machine Learning, vol. 15, No. 2, May 1994, pp. 201-221.

Domingos, P., "Metacost: A General Method for Making Classifiers Cost-Sensitive", In Proceedings of the 5th International Conference on Knowledge Discovery and Data Mining, San Diego, CA, US, Aug. 15-18, 1999, pp. 155-164.

Donmez, P. and Carbonell, J., "Paired Sampling in Density-Sensitive Active Learning", In Proceedings of the 10th International Symposium on Artificial Intelligence and Mathematics (ISAIM '08), Fort Lauderdale, FL, US, Jan. 2-4, 2008, pp. 1-8.

Donmez, P. et al., "Dual Strategy Active Learning", In the 18th European Conference on Machine Learning (ECML '07), Warsaw, PL, Sep. 17-21, 2007, pp. 1-12.

Ertekin, S. et al., "Learning on the Border: Active Learning in Imbalanced Data Classification", In Proceedings of the 16th ACM Conference on Information and Knowledge Management (CIKM '07), Libson, PT, Nov. 6-7, 2007, pp. 1-10.

Fawcett, T., "ROC Graphs: Notes and Practical Considerations for Data Mining Researchers", Technical Report hpl-2003-4, Jan. 2003, pp. 1-27.

Lewis, D.D. and Gale, W.A., "A Sequential Algorithm for Training Text Classifiers", In Proceedings of the 17th Annual International ACM SIGIR Conference on Research and Development in Infomation Retrieval (SIGIR '94), Dublin, IE, Jul. 3-6, 1994, pp. 3-12.

Liu, X.Y. et al., "Exploratory Undersampling for Class-Imbalance Learning", In IEEE Transactions on Systems, Man and Cybernetics, Part B: Cybernetics, Apr. 2009, pp. 539-550.

Lomasky, R. et al., "Active Class Selection", In Proceedings of the 18th European Conference on Machine Learning (ECML '07), Sep. 17-21, 2007, pp. 640-647.

Ma, J. et al., "Beyond Blacklists: Learning to Detect Malicious Web Sites from Suspicious URLs", In Proceedings of the 15th International Conference on Knowledge Discovery and Data Mining (SIGKDD '09), Paris, FR, Jun. 28-Jul. 1, 2009, pp. 1-9.

Nguyen, H.T. and Smeulders, A., "Active Learning Using Pre-Clustering", In Proceedings of the 21st International Conference on Machine Learning (ICML '04), New York, NY, US, Banff, AB, CA, Jul. 4-8, 2004, pp. 1-8.

Open Directory Project, "DMOZ", last updated Mar. 14, 2014, pp. 1-2, available at: http://www.dmoz.org.

Provost, F.J. et al., "Efficient Progressive Sampling", In Proceedings of the First Annual International Conference on Knowledge Discovery and Data Mining, San Diego, CA, US, Aug. 15-18, 1999, pp. 1-10.

Rajan, S. et al., "A Large-scale Active Learning System for Topical Categorization on the Web", In Proceedings of the 19th International World Wide Web Conference (WWW '10), Raleigh, NC, US, Apr. 26-30, 2010, pp. 1-10.

Saar-Tsechansky, M. and Provost, F., "Active Sampling for Class Probability Estimation and Ranking", In Machine Learning, vol. 54, No. 2, Feb. 2004, pp. 153-178.

Settles, B., "Active Learning Literature Survey", In Computer Sciences Technical Report, University of Wisconsin-Madison, last updated Jan. 26, 2010, pp. 1-67.

Seung, H.S., et al., "Query by Committee", In Proceedings of the Conference on Learning Theory (COLT '92), New York, NY, US, Jun. 23-26, 2016, pp. 1-8.

Sheng, V. S. et al., "Get Another Label? Improving Data Quality and Data Mining Using Multiple, Noisy Labelers", In the Proceedings of the 14th ACM SIGKDD International Conference on Knowledge Discovery and Data Mining, (SIGKDD '08), Las Vegas, NV, US, Aug. 24-27, 2008, pp. 1-9.

Tomanek, K. and Hahn, U., "Reducing Class Imbalance During Active Learning for Named Entity Annotation", In Proceedings of the 5th International Conference on Knowlege Capture (K-CAP '09), Redondo Beach, CA, US, Sep. 1-4, 2009, pp. 1-8.

Tong, S. and Koller, D., "Support Vector Machine Active Learning with Applications to Text Classification", In Journal of Machine Learning Res., vol. 2, Nov. 2001, pp. 45-66.

Weinberger, K. et al., "Feature Hasing for Large Scale Multitask Learning", In the Proceedings of the 26th International Conference on Machine Learning (IMCL '09), Montreal, CA, Jun. 14-18, 2009, pp. 1-8.

Weiss, G. and Provost, F., "The Effect of Class Distribution on Classifier Learning", Technical Report ML-TR-44, Department of Computer Science, Rutgers University, Aug. 2, 2001, pp. 1-26.

Weiss, G.M. and Provost, F., "Learning When Training Data are Costly: The Effect of Class Distribution on Tree Induction", In Journal of Artificial Intelligence Research, vol. 19, No. 1, Oct. 2003, pp. 315-354.

(56) References Cited

OTHER PUBLICATIONS

Weiss, G.M., "The Impact of Small Disjuncts on Classifier Learning", In Data Mining, vol. 8, Oct. 2010, pp. 193-226.
Winterberry Group LLC, "Beyond the Grey Areas: Transparency, Brand Safety and the Future of Online Advertising", Apr. 2010, pp. 1-19, available at: web.archive.org/web/20120504102716/http://adsafe.media.com/pdf/Beyond_the_Grey_Areas.pdf.
Zhu, J. and Hovy, E., "Active Learning for Word Sense Disambiguation with Methods for Addressing the Class Imbalance Problem", In Proceedings of the Joint Conference on Empirical Methods in Nat. Lang. Processing Computational Nat. Lang. Learning (EMNLP-CoNLL '07), Prague, CZ, Jun. 28-30, 2007, pp. 1-8.
Zhu, J. et al., "Active Learning with Sampling by Uncertainty and Density for Word Sense Disambiguation and Text Classification", In Proceedings of the 22nd International Conference on Computational Linguistics (COLING '08), Manchester, UK, Aug. 18-22, 2008, pp. 1137-1144.

\* cited by examiner

METHODS, SYSTEMS, AND MEDIA FOR PROVIDING DIRECT AND HYBRID DATA ACQUISITION APPROACHES

CROSS-REFERENCE TO RELATED APPLICATIONS

This application claims the benefit of U.S. Provisional Patent Application No. 61/292,718, filed Jan. 6, 2010, U.S. Provisional Patent Application No. 61/292,883, filed Jan. 7, 2010, and U.S. Provisional Patent Application No. 61/349,537, filed May 28, 2010, which are hereby incorporated by reference herein in their entireties.

FIELD OF THE INVENTION

The disclosed subject matter generally relates to methods, systems, and media for providing direct and hybrid data acquisition approaches. More particularly, the disclosed subject matter relates to the direct acquisition of training data from human oracles and hybrid data acquisition approaches, particularly, where the classes under consideration are substantially skewed (e.g., hate speech to non-hate speech).

BACKGROUND OF THE INVENTION

The interaction of humans in the data acquisition phase of the process of building classification models from data is critical. In the particular example of online advertising, advertisers and advertising networks (sometimes referred to herein as "advertisers") may juxtapose advertisements that represent such brands with undesirable content due to the opacity of the ad-placement process and possibly to a misalignment of incentives in the ad-serving ecosystem. Currently, neither the ad network nor the brand can efficiently recognize whether a website contains or has a tendency to contain questionable content. These advertisers desire a rating or classification system that estimates whether a web page or website displays objectionable content. With such a classification system, advertisers can control the destination of their advertisements, thereby advertising only on those pages deemed unlikely to display such unacceptable content. Evaluating each potential advertising opportunity involves classifying the web page with respect to objectionable categories (e.g., pornography or adult content, child content, hate speech, bombs, guns, ammunition, alcohol, offensive language, tobacco, spyware, malicious code, illegal drugs, music downloading, particular types of entertainment, illegality, obscenity, etc.).

Text classification models, such as statistically-based text classifiers, can be built to identify these types of content given the information available about the page. However, the training of these models requires labeled training examples, where the labeling reflects the presence or absence of the types of content of interest. This process is typically a lengthy, manual, and labor intensive and, therefore, costly and potentially error-prone.

For some portion of this and for a given budget, a micro-outsourcing system, such as Amazon's Mechanical Turk, can be used to submit human intelligence tasks to produce training data by labeling datasets for such a classification system. However, using these micro-outsourcing systems to manually examine every page encountered by such a classification system is prohibitively expensive. This is particularly true in the above-mentioned case of online advertising, where models for new classification categories must be built rapidly to meet the changing demands of each customer and each campaign. Further, with classifications based on statistical models, predictions are more or less effective depending on the particular cases used for training and on the amount and distribution of training data used in their construction.

Because the quality of a statistical model directly depends on the training data upon which it is built and because there is a limited budget for data acquisition, there is therefore a need in the art for enhanced and intelligent data acquisition approaches. Accordingly, it is desirable to provide methods, systems, and media that overcome these and other deficiencies of the prior art.

SUMMARY OF THE INVENTION

In accordance with various embodiments, mechanisms for providing direct and hybrid data acquisition approaches are provided.

Generally speaking, the disclosed subject matter relates to using multiple learning approaches (e.g., logistic regression, support vector machines, Bayesian approaches, decision trees, etc.) for constructing classification models for classifying content. The disclosed subject matter provides an alternative to labeling of candidate examples when constructing computer-trained classification models through either random sampling or active learning. In particular, user classification approaches can be used to identify class-exemplary instances (sometimes referred to herein as "guided learning" or "a guided learning approach").

It should be noted that these learning approaches are particularly useful in situations where the classes under consideration are substantially skewed (e.g., pornography or adult content, child content, hate speech, bombs, guns, ammunition, alcohol, offensive language, tobacco, spyware, malicious code, illegal drugs, music downloading, particular types of entertainment, illegality, obscenity, etc.) and where there are limited resources for acquiring human-reviewed information.

It should also be noted that these learning approaches are also particularly useful in situations having classes to be modeled that are made up of distinct, rare sub-concepts or disjunctive concepts (e.g., a certain rate type of hate speech or pornography). Gathering rare-class examples and exploring sub-concepts can be critical, where they may be difficult to gather even when its over-arching parent concept is more common.

To do this, the present invention provides computer-implemented classification approaches requesting human-selected examples meeting certain criteria, such as a particular balance between the classes of interest, and user classification approaches for constructing classification models.

In a more particular example, these classification models can be used for providing safe advertising. For example, these classification models can be used in a rating system to estimate and/or determine whether a web page or web site displays particular objectionable content (e.g., pornography or adult content, child content, hate speech, bombs, guns, ammunition, alcohol, offensive language, tobacco, spyware, malicious code, illegal drugs, music downloading, particular types of entertainment, illegality, obscenity, etc.). To make such a determination, the present invention can account for various data, such as the uniform resource locator (URL), the page text, the anchor text, DMOZ (the Open Directory Project) categories, third-party classifications, position in the network of pages, etc. The resulting classification models can be used to reduce the placement of on-line advertisements adjacent to such objectionable content.

It should be noted that, although generally described herein as using text data from a web page (e.g., the URL, the page text, the anchor text, etc.) as the raw feature data, any other suitable type of input can also be used. For example, image analysis can be conducted on one or more images contained on a web page.

In some embodiments, these classification models can instruct human reviewing resources to search for particular instances. Alternatively, these classification models can be used in connection with directly querying exemplary web pages. In another suitable example, these classification models can be used to instruct an oracle (e.g., users in a micro-outsourcing system) for search engine queries that would tend to reveal the class of interest. In yet another suitable example, these classification models can be used to query for online resources that may contain many pointers to the classes of interest (e.g., a portion of DMOZ that relates to a class).

These different sources of information can be combined in arbitrary mixes in accordance with any budget, class balance parameters, or any sampling ratio of any sub-concepts of interest. Additionally or alternatively, hybrid learning techniques can be utilized that combine guided learning approaches with active learning approaches and random sampling, thereby leveraging labelers for additional information. Accordingly, a guided learning approach and a hybrid learning approach can be provided based on the budget and skew parameters.

In accordance with some embodiments of the present invention, a method for data acquisition for construction of classification models that incorporates multiple human reviewing resources is provided, the method comprising: receiving a cost structure for constructing a classification model using a data set; instructing a plurality of human reviewing resources to search through the data set and select one or more instances of a class that satisfy at least one criterion, wherein the plurality of human reviewing resources are provided with a definition of the class; training the classification model with the one or more instances from the plurality of human reviewing resources; determining when an expected gain for performing additional searches by the plurality of human reviewing resources as a function of the cost structure is lower than a given threshold; and, in response to determining that the expected gain as a function of the cost structure is lower than the given threshold, instructing the plurality of human reviewing resources that was searching through the data set to label one or more examples from the data set.

In some embodiments, the method optionally switches to an active learning approach, where the classification model instructs the plurality of human reviewing resources that was searching through the data set to label examples from the data set perceived as being useful to the classification model. In response to determining that the subsequent labeling or annotation is no longer cost effective (e.g., the expected gain as a function of the cost structure is lower than a given threshold), the label acquisition is halted.

In accordance with some embodiments of the present invention, a system for data acquisition for construction of classification models that incorporates multiple human reviewing resources is provided. The system comprises a processor that: receives a cost structure for constructing a classification model using a data set; instructs a plurality of human reviewing resources to search through the data set and select one or more instances of a class that satisfy at least one criterion, wherein the plurality of human reviewing resources are provided with a definition of the class; trains the classification model with the one or more instances from the plurality of human reviewing resources; determines when an expected gain for performing additional searches by the plurality of human reviewing resources as a function of the cost structure is lower than a given threshold; and, in response to determining that the expected gain as a function of the cost structure is lower than the given threshold, instructs the plurality of human reviewing resources that was searching through the data set to label one or more examples from the data set.

In accordance with some embodiments of the present invention, a non-transitory computer-readable medium containing computer-executable instructions that, when executed by a processor, cause the processor to perform a method for data acquisition for construction of classification models that incorporates multiple human reviewing resources is provided. The method comprises: receiving a cost structure for constructing a classification model using a data set; instructing a plurality of human reviewing resources to search through the data set and select one or more instances of a class that satisfy at least one criterion, wherein the plurality of human reviewing resources are provided with a definition of the class; training the classification model with the one or more instances from the plurality of human reviewing resources; determining when an expected gain for performing additional searches by the plurality of human reviewing resources as a function of the cost structure is lower than a given threshold; and, in response to determining that the expected gain as a function of the cost structure is lower than the given threshold, instructing the plurality of human reviewing resources that was searching through the data set to label one or more examples from the data set.

BRIEF DESCRIPTION OF THE DRAWINGS

Various objects, features, and advantages of the disclosed subject matter can be more fully appreciated with reference to the following detailed description of the invention when considered in connection with the following drawing, in which like reference numerals identify like elements.

DETAILED DESCRIPTION OF THE INVENTION

Figure 1:
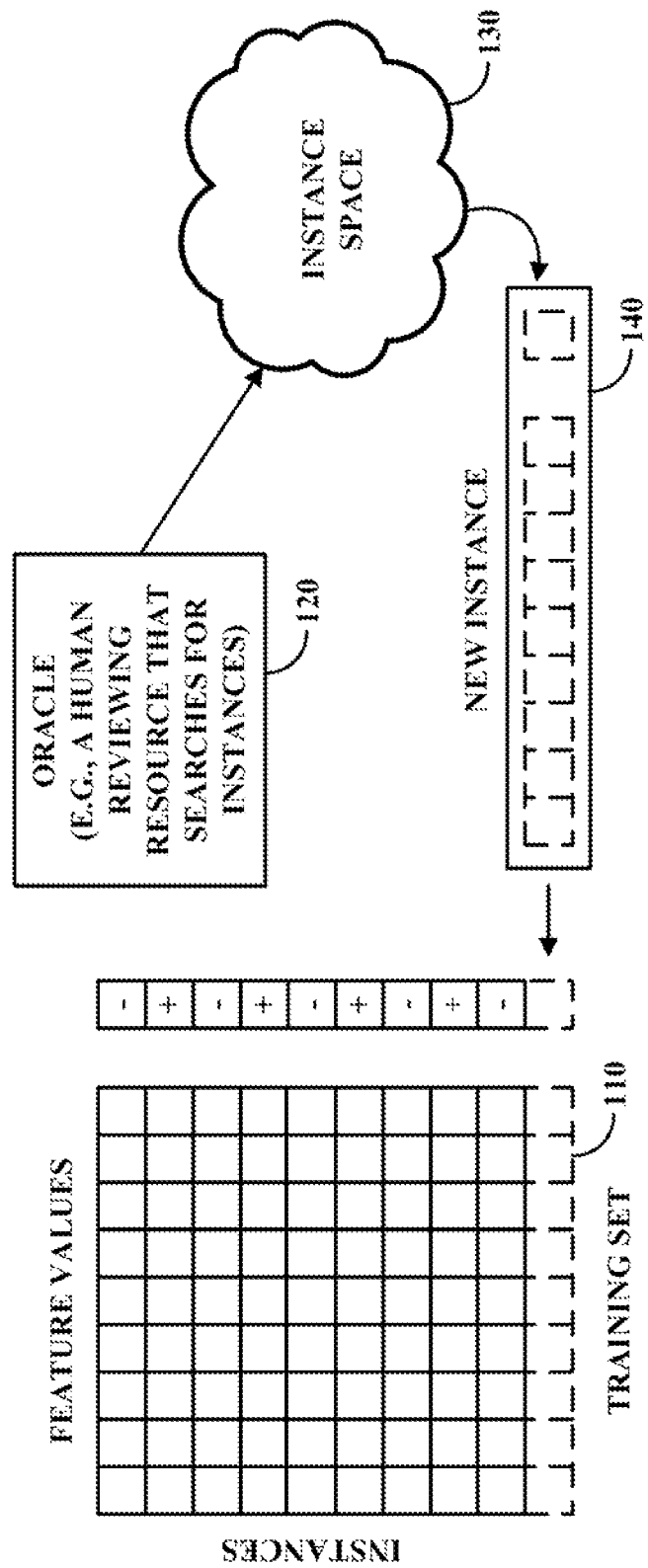
FIG. 1 is a diagram of a guided learning approach in accordance with some embodiments of the disclosed subject matter.

In accordance with various embodiments, mechanisms for providing direct and hybrid data acquisition approaches are provided.

Generally speaking, the disclosed subject matter relates to using multiple learning approaches (e.g., logistic regression, support vector machines, Bayesian approaches, decision trees, etc.) for constructing classification models for classifying content. The disclosed subject matter provides an alternative to labeling of candidate examples when constructing computer-trained classification models through either random sampling or active learning. In particular, user classification approaches can be used to identify class-exemplary instances (sometimes referred to herein as "guided learning" or "a guided learning approach").

It should be noted that these learning approaches are particularly useful in situations where the classes under consideration are substantially skewed (e.g., pornography or adult content, child content, hate speech, bombs, guns, ammunition, alcohol, offensive language, tobacco, spyware, malicious code, illegal drugs, music downloading, particular types of entertainment, illegality, obscenity, etc.) and where there are limited resources for acquiring human-reviewed information.

It should also be noted that these learning approaches are also particularly useful in situations having classes to be modeled that are made up of distinct, rare sub-concepts or disjunctive concepts (e.g., a certain rate type of hate speech or pornography). Gathering rare-class examples and exploring sub-concepts can be critical, where they may be difficult to gather even when its over-arching parent concept is more common.

To do this, the present invention provides computer-implemented classification approaches requesting human-selected examples meeting certain criteria, such as a particular balance between the classes of interest, and user classification approaches for constructing classification models.

In a more particular example, these classification models can be used for providing safe advertising. For example, these classification models can be used in a rating system to estimate and/or determine whether a web page or web site displays particular objectionable content (e.g., pornography or adult content, child content, hate speech, bombs, guns, ammunition, alcohol, offensive language, tobacco, spyware, malicious code, illegal drugs, music downloading, particular types of entertainment, illegality, obscenity, etc.). To make such a determination, the present invention can account for various data, such as the uniform resource locator (URL), the page text, the anchor text, DMOZ (the Open Directory Project) categories, third-party classifications, position in the network of pages, etc. The resulting classification models can be used to reduce the placement of on-line advertisements adjacent to such objectionable content.

Rating systems in which the hybrid learning approaches described herein are further described, for example, in Attenberg et al. U.S. patent application Ser. No. 12/859,763, filed Aug. 19, 2010, which is hereby incorporated by reference herein in its entirety.

It should be noted that, although generally described herein as using text data from a web page (e.g., the URL, the page text, the anchor text, etc.) as the raw feature data, any other suitable type of input can also be used. For example, image analysis can be conducted on one or more images contained on a web page.

In some embodiments, these classification models can instruct human reviewing resources to search for particular instances. Alternatively, these classification models can be used in connection with directly querying exemplary web pages. In another suitable example, these classification models can be used to instruct an oracle (e.g., users in a micro-outsourcing system) for search engine queries that would tend to reveal the class of interest. In yet another suitable example, these classification models can be used to query for online resources that may contain many pointers to the classes of interest (e.g., a portion of DMOZ that relates to a class).

These different sources of information can be combined in arbitrary mixes in accordance with any budget, class balance parameters, or any sampling ratio of any sub-concepts of interest. Additionally or alternatively, hybrid learning techniques can be utilized that combine guided learning approaches with active learning approaches and random sampling, thereby leveraging labelers for additional information. Accordingly, a learning application (sometimes referred to as "the application") is provided that interacts with human reviewers to implement guided learning approaches and/or hybrid learning approaches based on budget and skew parameters.

As mentioned above, the interaction of humans in the data acquisition phase of the process of building classification models from data is critical. Simply sampling cases uniformly at random is unlikely to be the optimal strategy. Settings with substantial or extreme class imbalance, as is generally the case with web content, further reduce the effectiveness of random sampling.

In cases with substantial skew, active learning approaches do not find any minority-class examples—examples of the positive class (e.g., adult content, hate speech, etc.) appear too infrequently in the pool of cases considered for labeling. For example, using active learning approaches, a model selects from a set of unlabeled examples, labels the selections, re-incorporates these labeled selections into the base model, and repeats. Even in moderately high skew settings, approaches for selecting examples automatically are more likely to select negative examples as opposed to examples of the positive class. As the minority class becomes more and more scarce, active learning approaches generally have increased difficulty finding instances that improve performance.

In accordance with some embodiments, multiple resources for constructing classification models for classifying content are used. More particularly, these mechanisms incorporate human resources in the data mining process or classification process, such as labeling examples selected via active learning or random sampling or searching for examples.

In some embodiments, active learning approaches can be provided in particular situations. Generally speaking, active learning is a machine learning approach that attempts to achieve greater accuracy with fewer labeled training instances if it is allowed to choose the data from which it learns. That is, an active learner can ask queries in the form of unlabeled instances to be labeled by an oracle (e.g., a human reviewer). In one particular embodiment, an uncertainty sampling approach can be used that selects the instances with the small margin from a large pool of unlabeled instances about which the model is least certain how to label. The margin can be calculated as follows:

$$|p(0)-p(1)|$$

In another embodiment, a boosted disagreement with a query-by-committee (QBC) approach can be used that involves maintaining a committee of models which are training on the labeled set, but represent competing hypotheses. This active learning approach is tailored to high skew settings utilizing boosted disagreement with QBC in order to gain a performance advantage in these difficult settings. In this embodiment, each committee member can vote on the labeling of query candidates, where instances can be ordered by a class-weighted disagreement measure that can be represented by:

$$-\sum_{j \in [0,1]} b_j \frac{V(k_j)}{|C|} \log \frac{V(k_j)}{|C|}$$

where $V(k_j)$ is the number of votes from a committee of size $|C|$ that an instance belongs to a class $k_j$ and $b_j$ is a weight corresponding to the importance of including a certain class. It should be noted that a larger value of $b_j$ corresponds to an increased tendency to include examples that are thought to belong to this class. From a window W of examples with highest disagreement, instances can be selected greedily based on the model's estimated class membership probabilities so that the batch selected from the window has the highest probability of having a balanced class membership.

In accordance with some embodiments, the learning application can provide guided learning approaches for data acquisition. Generally speaking, guided learning is an alternative approach for using human resources for creating and developing classification models. For example, the application using guided learning approaches can ask or instruct one or more human reviewers to search for examples representing the different classes in some proportion, p. These instances can then be provided as input to classifier induction.

Turning to FIG. 1, in guided learning approaches, an oracle 120 (e.g., one or more human reviewing resources, a human reviewer in a micro-outsourcing system, etc.) can be instructed or tasked with searching for examples or class-exemplary instances through an instance space 130 that satisfy one or more criteria. Alternatively or additionally, guided learning approaches can include directly querying exemplary web pages, querying an oracle for search engine queries or using other tools that would tend to reveal the class of interest, or querying online resources that may contain many pointers to the classes of interest (e.g., a portion of DMOZ that relates to a class). In response to selecting one or more new instances 140 from instance space 130, the selected instances 140 can be inserted or incorporated into the appropriate training data (e.g., training set 110) for training the classification model.

More particularly, as also shown in FIG. 1, given an initial pool of labeled instances P with some subset of minority and majority instances, $P_+$ and $P_-$, respectively, along with a selection ratio, p, at each batch, the application using the guided learning approach can select $p|b|$ instances from $P_+$ at random and $(1-p)|b|$ instances uniformly at random from P where $|b|$ is the size of the batch selected at each selection epoch and where the randomness is governed by a hidden process conditioned on how individuals understand the classes of interest and access the example space. This can continue until further data acquisition is determined to be no longer useful—for example, when it is determined that the learning approaches provides diminishing marginal returns on increased model performance.

FIGS. 2A-2F provide illustrative graphs comparing the area under the receiver operating characteristics curve (AUC) at various stages in learning in accordance with some embodiments of the disclosed subject matter. More particularly, FIGS. 2A-2F show how the area under the receiver operating characteristics curve improves with additional labeled training data.

Each of FIGS. 2A-2F shows one of six data sets with similar characteristics, where each represents a task of separating examples of one minority class from examples of a diffuse collection of other topics. The illustrative data sets are as follows:

1. Safe-Adult: A set containing about 35,000 pages labeled based on the presence of adult content, where positive instances are deemed unsafe for advertising and advertisers generally choose not to be associated with this type of content. This has a class skew of about 20:1.
2. Safe-Guns: A set containing about 55,000 pages labeled based on the presences of guns, ammunition, bombs, or other destructive equipment, where positive instances are deemed unsafe for advertising and advertisers generally choose not to be associated with this type of content. This has a class skew of about 150:1.
3. DMOZ-Science: A set containing about 130,000 instances, where positive instances belong to the top-level DMOZ category of Science and the minority instances belong to other categories. This has a class skew of about 200:1.
4. DMOZ-News: A set containing about 100,000 instances, where positive instances are web pages found in the top-level DMOZ category of News and the minority instances belong to other categories. This has a class skew of about 100:1.
5. DMOZ-Games: A set containing about 100,000 instances, where positive instances are web pages found in the top-level DMOZ category of Games and the minority instances belong to other categories. This has a class skew of about 100:1.
6. 20-News-Groups: A data set derived from the popular 20 News Groups, where a positive instance or label is assigned to science-related articles and a negative label to other articles. This has a class skew of about 80:1.

It should be noted that the data sets DMOZ-Science, DMOZ-News, and DMOZ-Games are taken from uniform resource locators (URLs) contained in the topical hierarchical taxonomy of the Open Directory Project. These and the other selected data sets are merely illustrative and any suitable data sets can be used. For example, a suitable data set can include predictive covariates for the application of classification models including, for example, uniform resource locators (URLs), page text, anchor text, and DMOZ categories.

It should also be noted that classification and probability estimation are performed with logistic regression trained using stochastic gradient descent using feature hashing.

Figure 2A:
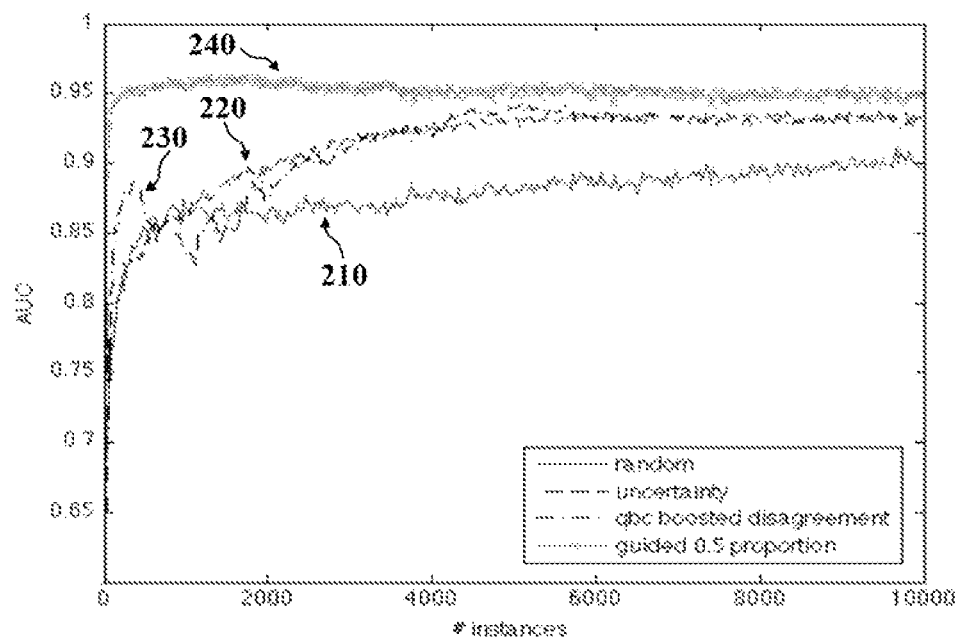
FIGS. 2A-2F are diagrams of illustrative graphs comparing the area under the receiver operating characteristics curve (AUC) at various stages in learning in accordance with some embodiments of the disclosed subject matter.
Figure 2B:
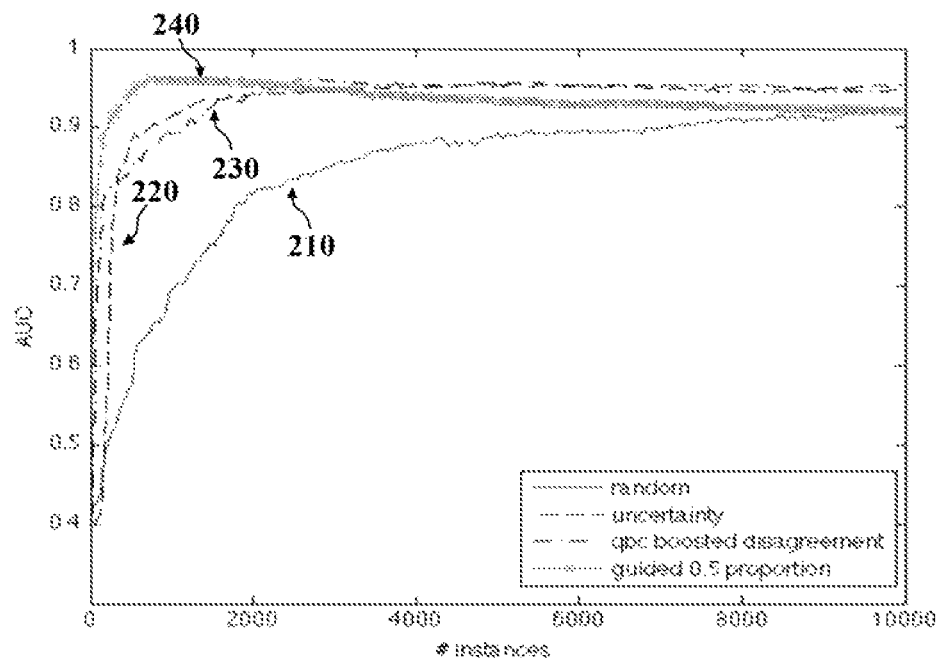
Figure 2C:
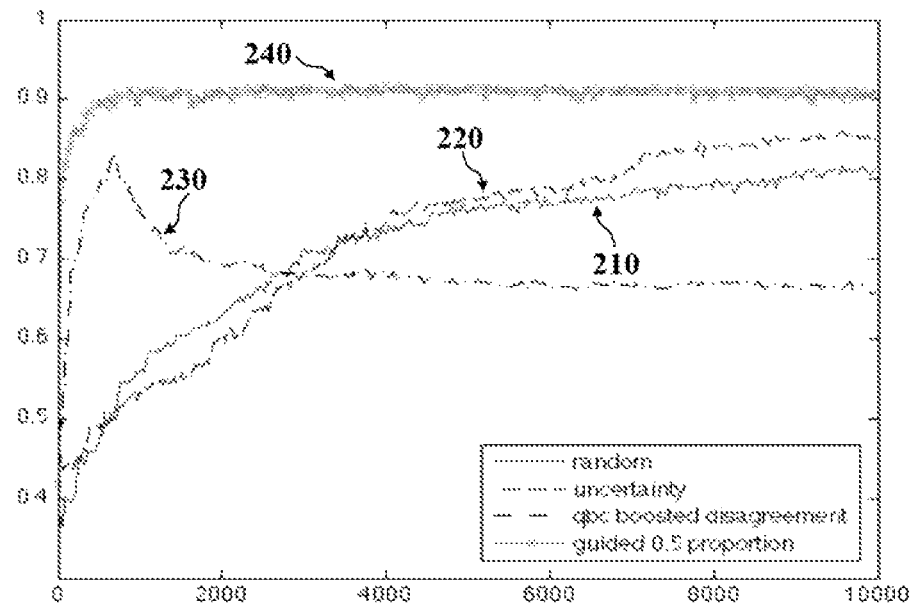
Figure 2D:
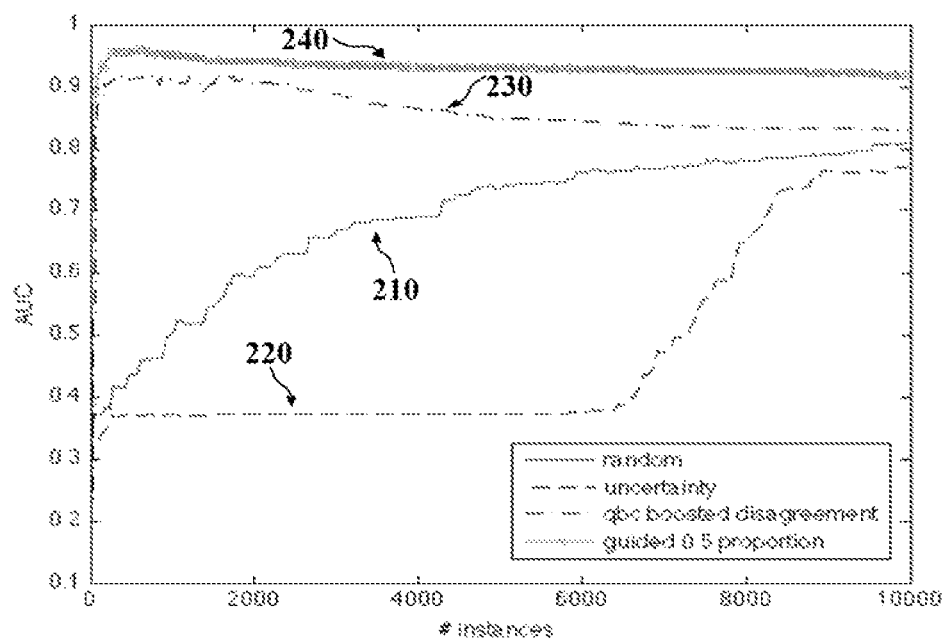
Figure 2E:
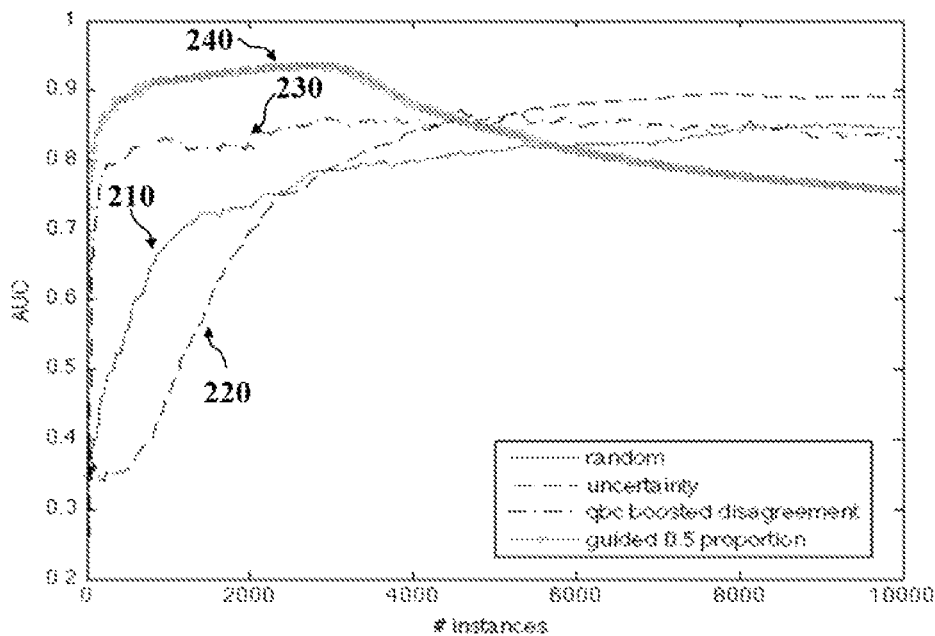

FIGS. 2A-2F provide a comparison of the area under the receiver operating characteristics curve (AUC), a measure that is substantially insensitive to the class prior in the evaluation set and also to the difference in class priors between the training and test sets. This is critical in a highly skewed setting where simply choosing the majority label for each instance would yield very high (and misleading) classification accuracy, and where one often wants to dope the training set with additional minority-class examples. As described previously, four different data acquisition approaches are used—e.g., uniform random sampling (line 210), an active learning approach with uncertainty sampling (line 220), an active learning approach tailored to high skew settings using boosted disagreement and query-by-committee along with random sampling (line 230), and a guided learning approach with a proportion of 0.5 (line 240)—for each of the data sets—Safe-Adult (FIG. 2A), Safe-Guns (FIG. 2B), DMOZ-Science (FIG. 2C), DMOZ-News (FIG. 2D), and DMOZ-Games (FIG. 2E).

As shown in each of FIGS. 2A-2F, guided learning approaches (e.g., line 240 in FIGS. 2A-2F) that search for examples of each class in balanced proportion provides substantially more informative data to the modeling process. More particularly, guided learning approaches (e.g., line 240 in FIGS. 2A-2F) quickly achieve good class separation (e.g., an AUC in the high 90s) with considerably fewer examples required by active learning approaches (e.g., lines 220 and 230 in FIGS. 2A-2F) or random sampling (e.g., line 110 in FIGS. 2A-2F). In comparison, uncertainty sampling offers little benefits over simply selecting instances at random by requiring thousands of examples to achieve the performance levels of a few hundred instances selected through guided learning approaches. Boosted disagreement with QBC performs similarly to uncertainty sampling.

Figure 2F:
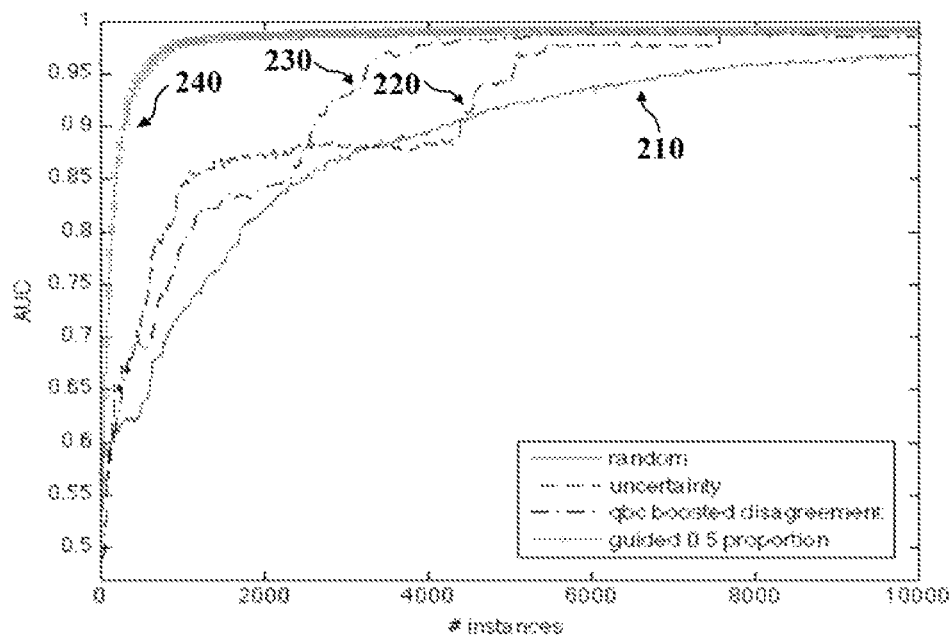

It should be noted that FIG. 2F, which corresponds to the 20-News-Groups data set, shows that active learning approaches—i.e., uncertainty sampling (line 220) and boosted disagreement (line 230)—initially perform quite well prior to reaching a plateau. Only after exhausting a large number of seemingly uninformative examples do these approaches choose examples for labeling that again provide improvement over random sampling (line 210). Thus, a disjunctive minority class exists, where portions of the class lie within the high certainty (of majority) regions of the example space. Examples from these disjuncts are selected when active learning approaches exhaust the less-certain instances. This means that little improvement is offered after repeated example selection.

Accordingly, active learning approach can be ill-suited for learning highly skewed, possibly disjunctive concepts. In these situations, gathering rare-class examples and exploring sub-concepts can be critical. In active learning approaches, the base-learner often has a poor understanding of the problem space, thus making poor selection of subsequent instances as a result, in turn offering little improvement in model performance. Guided learning approaches, on the other hand, do not depend on the quality of the base-learner and rely on an oracle to explore the details of the space. More particularly, guided learning approaches excel at finding different examples of the minority class, while active learning approaches can fine-tune the decision boundary of the base model.

It should be noted that the per-instance cost for a guided learning approach can differ from that for label-based active learning approaches. In some examples, searching for an example of an obscure class may require more effort than identifying or labeling if a given sample belongs to the class of interest. Alternatively, in other examples, using tools like web search engines, examples can be readily found, whereas labeling requires time-consuming analysis of each case. The relative costs of guided learning approaches and instance labeling in active learning approaches vary from setting to setting.

Figure 3:
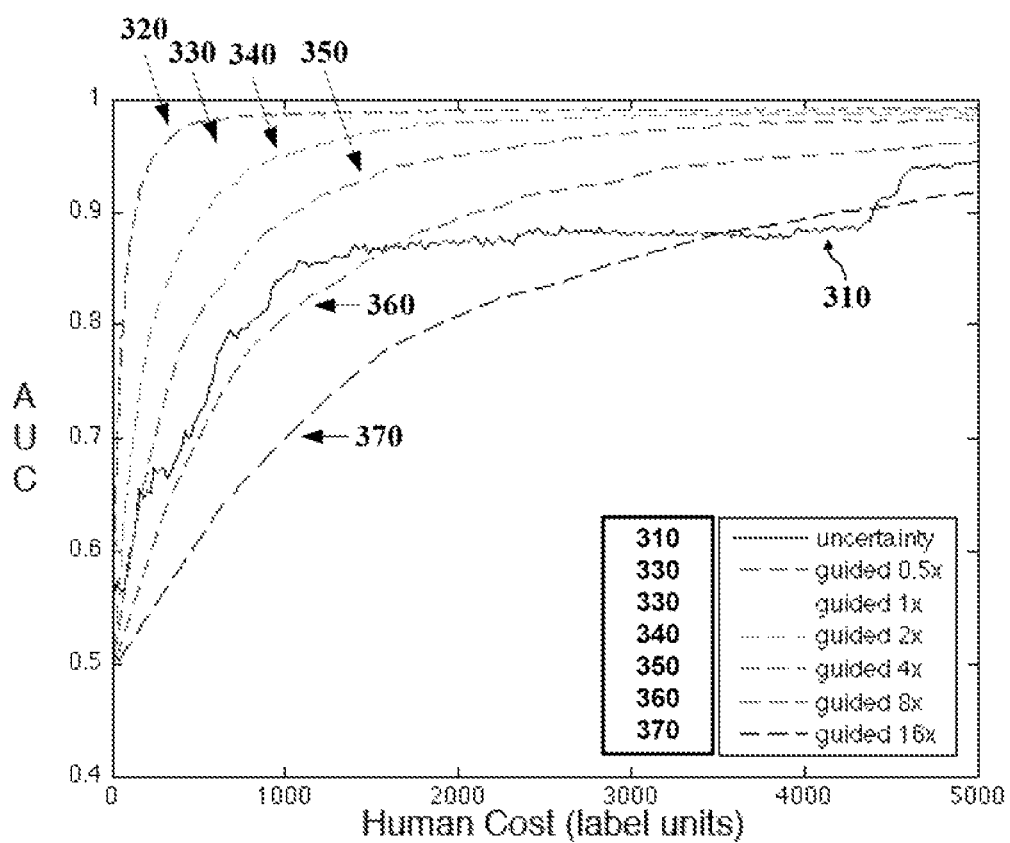
FIG. 3 is a diagram of an illustrative graph comparing various instantiations of a guided learning approach with uncertainty sampling on a data set in accordance with some embodiments of the disclosed subject matter.

FIG. 3 shows an illustrative graph comparing various instantiations of a guided learning approach with uncertainty sampling on a data set in accordance with some embodiments of the disclosed subject matter. In particular, each curve shows the increase in performance as a function of investment in human effort whether for labeling or search. The horizontal axis shows the total costs expended by each approach. For FIG. 3, the cost of labeling using an active learning approach (uncertainty sampling) is normalized at 1 (for acquiring one label) and the different instantiations of guided learning approaches vary the relative cost of search ($\gamma$) from $\gamma=0.5$ (half the cost of labeling) to $\gamma=16$ (16 times the cost of labeling).

As shown in FIG. 3, the performance-per-unit-cost of guided learning approaches declines gradually as the cost is increased. In particular, for the 20-News-Groups data set, the performance-per-unit-cost of uncertainty sampling (active learning approaches) is approximately equivalent to guided learning approaches when search is approximately 8 times the cost of labeling or $\gamma=8$.

As described herein, guided learning approach may be used in cases where the class priors are extremely unbalanced and the cost structure is skewed in the opposite direction. That is, misclassifying an example that truly belongs to the minority class (predicting that is belongs to the majority class) is much more costly than predicting a majority example as belonging to the minority class.

In a safe advertising example, a learning application implementing a guided learning approach is provided with a rating system. The learning application can collect class-exemplary URLs to facilitate the production of statistical models. For example, the learning application can work with one or more micro-outsourcing resources towards the construction of statistical models for use in a safe advertising system. A human reviewer in a micro-outsourcing resource is provided with the definition of a class under consideration and tasked with finding examples of this class using available tools. Responses can then be checked for duplication, and optionally passed through an explicit labeling system to ensure correctness, thereby reducing instances of noise and spam. The resulting URLs are then passed to a learning application or any other suitable machine learning system, where model induction is performed.

More particularly, in order to determine whether the results indeed hold for such a production setting, human reviewers are tasked with finding examples of adult content and non-adult content in equal proportions. These results are held in a pool, where training instances are drawn to build models and produce learning curves. The induced models can then be compared to the models created through the guided learning approach that accesses the human user labeled data set, Safe-Adult.

It should be noted that, in some embodiments, it can be preferable to ask for keyword queries that, when posed to a search engine, are highly or substantially likely to return class-representative examples. Alternatively, in some embodiments, it can be preferable to ask for directory pages, such as subsets of DMOZ likely to contain examples of interest. There queries can be performed, for example, in cases with rare of disjunctive sub-concepts (e.g., a rare type of hate speech).

It should also be noted that, in some embodiments, when portions of a class are poorly represented, instructions can be altered to seek more examples from these portions of the problem space.

It should further be noted that, in some embodiments, in substantially skewed settings, it can be preferable to select random unlabeled examples from the pool and assume a negative example, rather than seeking majority instances explicitly. Depending on the base rate, the number of mistaken labels that result from such a strategy may be far lower than the typical human error results from a human labeling system.

In accordance with some embodiments, mechanisms can be provided that hybrid learning approaches that include active learning approaches and guided learning approaches. For example, the application can use active learning approaches to search for appropriate training data and, if it is determined that the active learning approaches have reached a plateau (e.g., FIGS. 2F and 3), performing a search using guided learning approaches to inject additional information.

Figure 4:
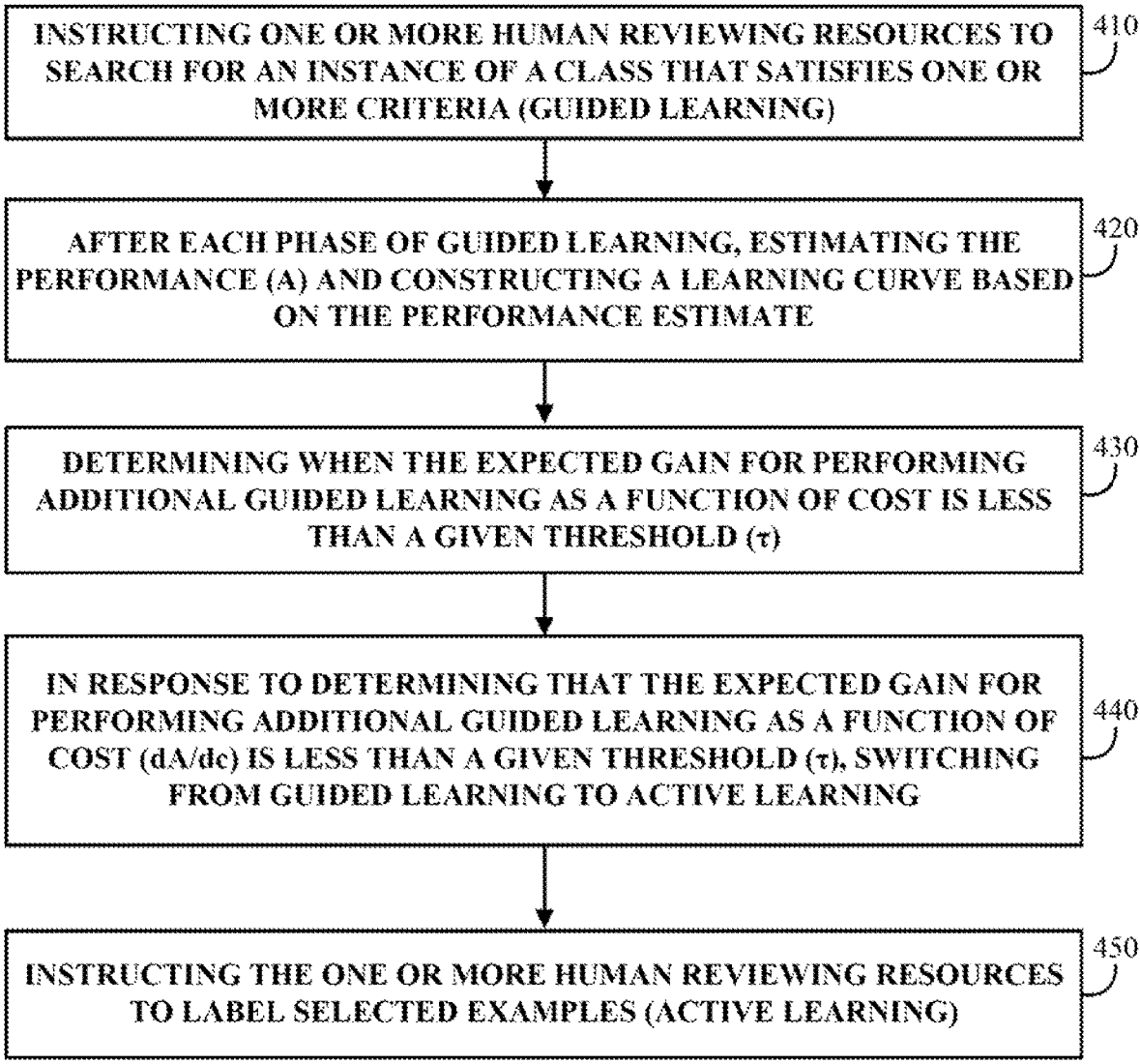
FIG. 4 is a diagram of an illustrative process for providing a hybrid learning approach in accordance with some embodiments of the disclosed subject matter.

FIG. 4 is a diagram showing an example of a process 400 for providing hybrid learning approaches in accordance with some embodiments of the disclosed subject matter. It should be noted that budget can be addressed by the hybrid learning approaches. As described herein, the hybrid learning approaches can be used to balance the usefulness-at-cost of guided learning approaches and active learning approaches, where guided learning approaches can be performed to search and gather whatever class balance (skew) is thought to be most useful independent of the class skew.

Generally speaking, given a budget B, a data set D, and a cost structure C, policies for hybrid learning approaches that include active learning approaches and guided learning approaches can allocate budget B to a suitable combination of guided search (via guided learning approaches) and instance labeling (via active learning approaches).

As shown in FIG. 4, process 400 begins by instructing one or more human reviewing resources to search for an instance of a class that satisfies one or more criteria at 410.

More particularly, given a certain cost structure that represents the cost-per-query to an oracle performing a guided learning approach, the application can perform guided learning by selecting instances from both classes in proportion, p. After each phase of guided learning, the application estimates the performance, A, and uses this performance estimate to construct a learning curve at 420. At 430, when the expected gain for performing additional guided learning as a function of cost is sufficiently low or below a given threshold, τ, such that:

$$\frac{\partial A}{\partial c} \leq \tau$$

the application can switch from a guided learning approach (searching) to an active learning approach (labeling) that involves selecting examples from the pool for which to request labels.

It should be noted that, to determine when to switch between learning approaches, the application determines how the performance of a model is changing under a given selection scheme as a function of that scheme's cost, $$\frac{\partial A}{\partial c}.$$

This can involve estimation of the model's performance at each epoch. For example, the application can compute x-validated accuracy of the current model on the available pool of instances. Progress of the learning curve is estimated empirically and a LOESS regression is used in order to smooth the variances in estimated learning rates at each epoch. More particularly, the learning rate at any point is estimated by determining the slope of a least-squares linear regression fit to performance estimates local to that point. When the slope of accuracy as a function of cost drops below a given threshold, τ, the application change learning approaches from a guided learning approach to an active learning approach at 440. At 450, the active learning approach can include, for example, selecting examples from the pool for which to request labels.

It should also be noted that, in the process flow chart 400 of FIG. 4, some steps can be added, some steps may be omitted, the order of the steps may be re-arranged, and/or some steps may be performed simultaneously. For example, as shown in FIG. 4, the learning application starts with a guided learning approach to search for good training data (potentially at a higher cost-per-example) and, upon determining that the performance as a function of cost is less than a particular threshold, switches to an active learning approach that labels examples. Alternatively, the learning application can start with an active learning approach that labels examples and, upon reaching a plateau (as shown in FIG. 2F) or any other suitable determination, can switch to a guided learning approach that searches to inject additional information.

Figure 5:
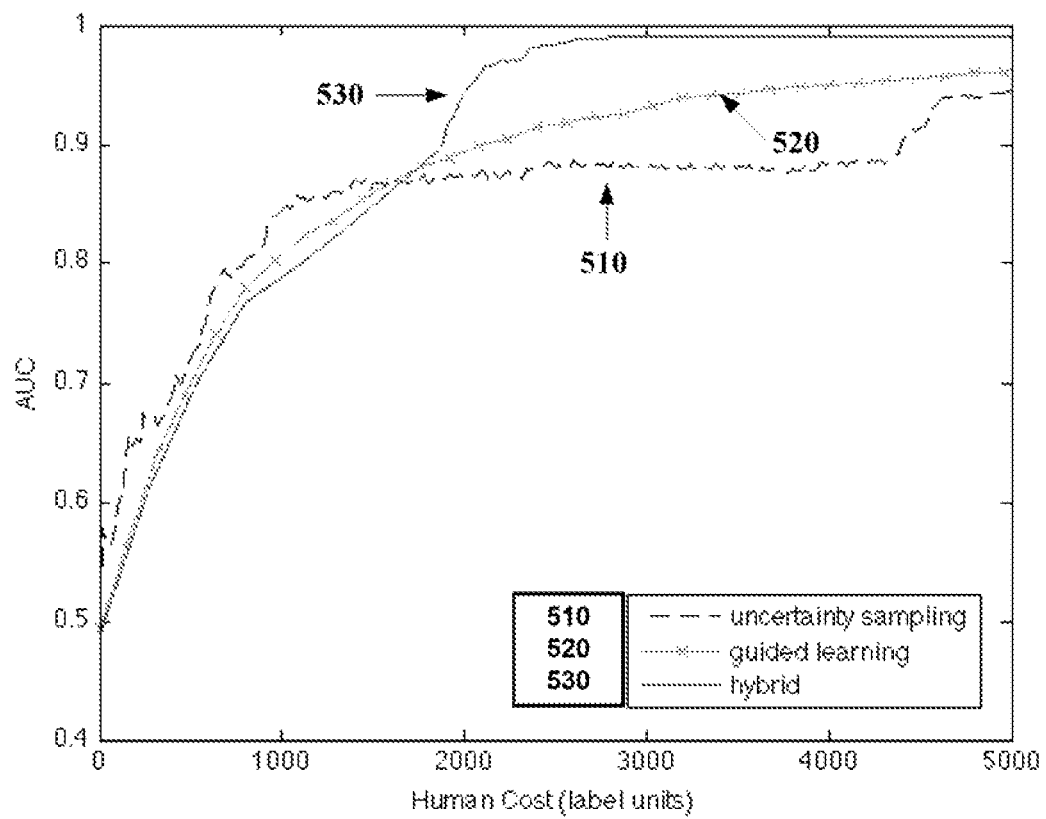
FIG. 5 is a diagram of an illustrative graph comparing a hybrid learning approach with an active learning approach and a guided learning approach in accordance with some embodiments of the disclosed subject matter.

FIG. 5 provides an illustrative graph showing a comparison of a hybrid learning approach to guided learning approaches and active learning approaches (uncertainty sampling) in accordance with some embodiments of the disclosed subject matter. As shown, a switch from a guided learning approach (line 520) to an active learning approach (line 510) improves the learning rate beyond what is achieved by either learning approach alone. It should be noted that as the human cost approaches about 2,000 label units, the slope of the learning curve for the hybrid learning approach (line 430) increases substantially as the application switches from a guided learning approach (searching; line 520) to an active learning approach (labeling; line 510). Accordingly, as shown in FIG. 5, the hybrid learning approach (530) benefits from a strong exploratory phase that randomly samples instances from across both classes, thereby leaving it in a state amenable to refinement by an active learning approach.

Figure 6:
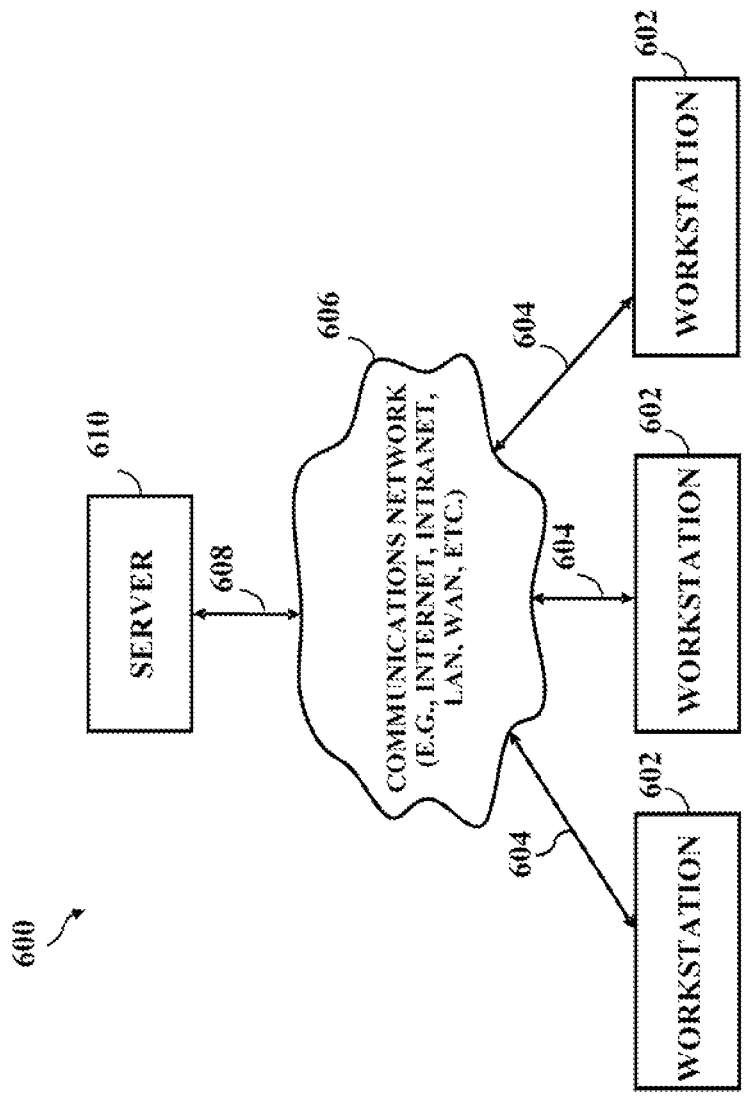
FIG. 6 is a diagram of an illustrative system on which a guided learning application can be implemented in accordance with some embodiments of the disclosed subject matter.

FIG. 6 is a generalized schematic diagram of a system 600 on which the learning application may be implemented in accordance with some embodiments of the disclosed subject matter. As illustrated, system 600 may include one or more user computers 602. User computers 602 may be local to each other or remote from each other. User computers 602 are connected by one or more communications links 604 to a communications network 606 that is linked via a communications link 608 to a server 610.

System 600 may include one or more servers 610. Server 610 may be any suitable server for providing access to the application, such as a processor, a computer, a data processing device, or a combination of such devices. For example, the application can be distributed into multiple backend components and multiple frontend components or interfaces. In a more particular example, backend components, such as data collection and data distribution can be performed on one or more servers 610. Similarly, the graphical user interfaces displayed by the application, such as a data interface and an advertising network interface, can be distributed by one or more servers 610 to user computer 602.

More particularly, for example, each of the client 602 and server 610 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client 602 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 6, communications network 606 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 604 and 608 may be any communications links suitable for communicating data between user computers 602 and server 610, such as network links, dial-up links, wireless links, hard-wired links, any other suitable communications links, or a combination of such links. User computers 602 enable a user to access features of the application. User computers 602 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. User computers 602 and server 610 may be located at any suitable location. In one embodiment, user computers 602 and server 610 may be located within an organization. Alternatively, user computers 602 and server 610 may be distributed between multiple organizations.

Figure 7:
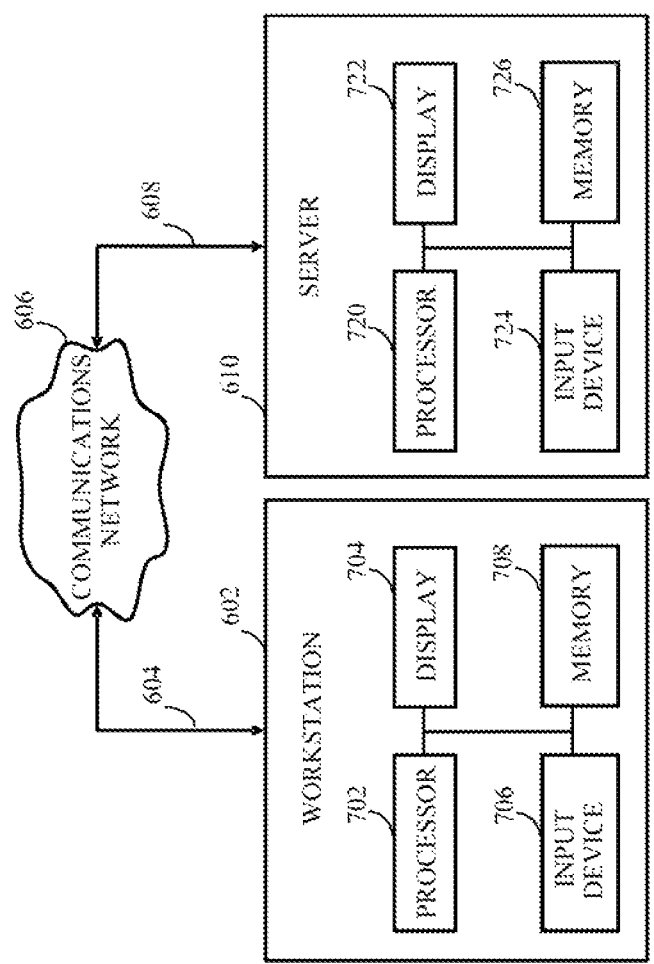
FIG. 7 is a diagram of an illustrative user computer and server as provided, for example, in FIG. 6 in accordance with some embodiments of the disclosed subject matter.

Referring back to FIG. 6, the server and one of the user computers depicted in FIG. 6 are illustrated in more detail in FIG. 7. Referring to FIG. 7, user computer 602 may include processor 702, display 704, input device 706, and memory 708, which may be interconnected. In a preferred embodiment, memory 708 contains a storage device for storing a computer program for controlling processor 702.

Processor 702 uses the computer program to present on display 704 the application and the data received through communications link 704 and commands and values transmitted by a user of user computer 702. It should also be noted that data received through communications link 704 or any other communications links may be received from any suitable source. Input device 706 may be a computer keyboard, a cursor-controller, dial, switchbank, lever, or any other suitable input device as would be used by a designer of input systems or process control systems.

Server 610 may include processor 720, display 722, input device 724, and memory 726, which may be interconnected. In a preferred embodiment, memory 726 contains a storage device for storing data received through communications link 608 or through other links, and also receives commands and values transmitted by one or more users. The storage device further contains a server program for controlling processor 720.

In some embodiments, the application may include an application program interface (not shown), or alternatively, the application may be resident in the memory of user computer 602 or server 610. In another suitable embodiment, the only distribution to user computer 602 may be a graphical user interface ("GUI") which allows a user to interact with the application resident at, for example, server 610.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Accordingly, methods, systems, and media for providing direct and hybrid data acquisition approaches are provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for data acquisition for construction of classification models, the method comprising:
    (a) receiving, using a hardware processor, a budget and a cost structure for constructing a classification model using a data set that includes positive and negative examples of a class of interest, wherein the classification model is set to a guided learning mode that receives selected instances of the class of interest that satisfy at least one criterion from the data set and wherein the cost structure includes a cost of a search performed by a human reviewer;
    (b) in response to the classification model being set to the guided learning mode, transmitting, using the hardware processor, a definition of the class of interest over the Internet for review by a plurality of human reviewers;
    (c) in response to the classification model being set to the guided learning mode, transmitting, using the hardware processor, instructions over the Internet to the plurality of human reviewers to search through the data set and select one or more instances of the class that satisfy at least one criterion;
    (d) receiving, using the hardware processor, an indication over the Internet that the one or more instances from the data set have been selected by at least one of the plurality of human reviewers;
    (e) training the classification model in the guided learning mode, using the hardware processor, with the one or more selected instances;
    (f) estimating, using the hardware processor, a performance of the classification model after training the classification model with the one or more selected instances to construct a learning curve;
    (g) determining, using the hardware processor, a rate of change in the estimated performance of the classification model as a function of the cost of at least one of the plurality of human reviewers performing an additional search in the guided learning mode, wherein the rate of change in the estimated performance of the classification model is determined based on a slope of the learning curve;
    (h) repeating (b)-(g) until it is determined at (g) that the rate of change in the estimated performance as a function of the cost of the at least one of the plurality of human reviewers performing the additional search in the guided learning mode is lower than a first predetermined threshold;
    (i) switching, using the hardware processor, the classification model from the guided learning mode to an active learning mode, which includes machine learning, that receives labelled instances from portions of the data set selected as being useful to the classification model in response to determining that the rate of change in the estimated performance as a function of the cost of the at least one of the plurality of human reviewers performing the additional search in the guided learning mode is lower than the first predetermined threshold at (h), until the estimated performance of the classification model is greater than a second predetermined threshold or the budget for constructing the classifier has been exhausted, wherein the plurality of human reviewers include human reviewers that are available to label one or more instances of the class of interest during training of the classification model using the active learning mode and human reviewers that are available to search for the one or more instances of the class of interest in response to the instruction transmitted at (c), and wherein the training of the classification model using the active learning mode is discontinued in response to determining that the rate of change in the estimated performance as a function of a cost of labeling performed by the plurality of human reviewers is lower than a third predetermined threshold;
    (j) receiving, using the hardware processor, identifying information of a web page to be classified by the trained classification model;
    (k) classifying, using the hardware processor, the web page using the trained classification model to determine whether the web page is a member of the class of interest; and
    (l) transmitting information indicating whether the web page is a member of the class of interest to an advertiser, over the Internet, in response to receiving a request for classification information about the web page.

2. The method of claim 1, further comprising:
    allocating, using the hardware processor, a portion of the budget to the plurality of human reviewers available for searching and a remaining portion of the budget to the plurality of human reviewers available for labeling.

3. The method of claim 1, wherein the at least one criterion includes a criterion that the one or more instances to be selected are to be positive examples of the class of interest.

4. The method of claim 1, wherein a subset of the data set is selected for presentation to the plurality of human reviewers by at least one of: uncertainty sampling and boosted disagreement with query-by-committee.

5. The method of claim 1, wherein the data set includes online resources containing pointers to the class of interest, and wherein the instructions to search through the data set further comprise instructions to query the online resources for examples of the class of interest that meet the at least one criterion.

6. A system for data acquisition for construction of classification models, the system comprising:
   a processor that:
   (a) receives a budget and a cost structure for constructing a classification model using a data set that includes positive and negative examples of a class of interest, wherein the classification model is set to a guided learning mode that receives selected instances of the class of interest that satisfy at least one criterion from the data set and wherein the cost structure includes a cost of a search performed by a human reviewer;
   (b) in response to the classification model being set to the guided learning mode, transmits a definition of the class of interest over the Internet for review by a plurality of human reviewers;
   (c) in response to the classification model being set to the guided learning mode, transmits instructions to the plurality of human reviewers over the Internet to search through the data set and select one or more instances of the class that satisfy at least one criterion;
   (d) receives an indication over the Internet that the one or more instances from the data set have been selected by at least one of the plurality of human reviewers;
   (e) trains the classification model in the guided learning mode with the one or more selected instances;
   (f) estimates a performance of the classification model after training the classification model with the one or more selected instances to construct a learning curve;
   (g) determines a rate of change in the estimated performance of the classification model as a function of the cost of at least one of the plurality of human reviewers performing an additional search in the guided learning mode, wherein the rate of change in the estimated performance of the classification model is determined based on a slope of the learning curve;
   (h) repeats (a)-(g) until it is determined at (g) that the rate of change in the estimated performance as a function of the cost of the at least one of the plurality of human reviewers performing the additional search in the guided learning mode is lower than a first predetermined threshold;
   (i) switches the classification model from the guided learning mode to an active learning mode, which includes machine learning, that receives labelled instances from portions of the data set selected as being useful to the classification model in response to determining that the rate of change in the estimated performance as a function of the cost of the at least one of the plurality of human reviewers performing the additional search in the guided learning mode is lower than the first predetermined threshold at (h), until the estimated performance of the classification model is greater than a second predetermined threshold or the budget for constructing the classifier has been exhausted, wherein the plurality of human reviewers include human reviewers that are available to label one or more instances of the class of interest during training of the classification model using the active learning mode and human reviewers that are available to search for the one or more instances of the class of interest in response to the instruction transmitted at (c), and wherein the training of the classification model using the active learning mode is discontinued in response to determining that the rate of change in the estimated performance as a function of a cost of labeling performed by the plurality of human reviewers is lower than a third predetermined threshold;
   (j) receives identifying information of a web page to be classified by the trained classification model;
   (k) classifies the web page using the trained classification model to determine whether the web page is a member of the class of interest; and
   (l) transmitting information indicating whether the web page is a member of the class of interest to an advertiser, over the Internet, in response to receiving a request for classification information of the web page.

7. The system of claim 6, wherein the processor is further configured to:
   allocate a portion of the budget to the plurality of human reviewers available for searching and a remaining portion of the budget to the plurality of human reviewers available for labeling.

8. The system of claim 6, wherein the at least one criterion includes a criterion that one or more instances to be selected are to be positive examples of the class of interest.

9. The system of claim 6, wherein a subset of the data set is selected for presentation to the plurality of human reviewers by at least one of: uncertainty sampling and boosted disagreement with query-by-committee.

10. The system of claim 6, wherein the data set includes online resources containing pointers to the class of interest, and wherein the processor is further configured to instruct the plurality of human reviewers to query the online resources for examples of the class of interest that meet the at least one criterion.

11. A non-transitory computer-readable medium containing computer-executable instructions that, when executed by a processor, cause the processor to perform a method for data acquisition for construction of classification models, the method comprising:
   (a) receiving a budget and a cost structure for constructing a classification model using a data set that includes positive and negative examples of a class of interest, wherein the classification model is set to a guided learning mode that receives selected instances of the class of interest that satisfy at least one criterion from the data set and wherein the cost structure includes a cost of a search performed by a human reviewer;
   (b) in response to the classification model being set to the guided learning mode, transmitting a definition of the class of interest over the Internet to a plurality of human reviewers;
   (c) in response to the classification model being set to the guided learning mode, transmitting instructions to the plurality of human reviewers to search through the data set and select one or more instances of the class that satisfy at least one criterion;
   (d) receiving an indication over the Internet that the one or more instances from the data set have been selected by at least one of the plurality of human reviewers;
   (e) training the classification model in the guided learning mode with the one or more selected instances;
   (f) estimating a performance of the classification model after training the classification model with the one or more selected instances to construct a learning curve;

(g) determining a rate of change in the estimated performance of the classification model as a function of the cost of at least one of the plurality of human reviewers performing an additional search in the guided learning mode, wherein the rate of change in the estimated performance of the classification model is determined based on a slope of the learning curve;

(h) repeating (b)-(g) until it is determined at (g) that the rate of change in the estimated performance as a function of the cost of the at least one of the plurality of human reviewers performing the additional search in the guided learning mode is lower than a first predetermined threshold;

(i) switching, using the hardware processor, the classification model from the guided learning mode to an active learning mode, which includes machine learning, that receives labelled instances from portions of the data set selected as being useful to the classification model in response to determining that the rate of change in the estimated performance as a function of the cost of the at least one of the plurality of human reviewers performing the additional search in the guided learning mode is lower than the first predetermined threshold at (h), until the estimated performance of the classification model is greater than a second predetermined threshold or the budget for constructing the classifier has been exhausted, wherein the plurality of human reviewers include human reviewers that are available to label one or more instances of the class of interest during training of the classification model using the active learning mode and human reviewers that are available to search for the one or more instances of the class of interest in response to the instruction transmitted at (c), and wherein the training of the classification model using the active learning mode is discontinued in response to determining that the rate of change in the estimated performance as a function of a cost of labeling performed by the plurality of human reviewers is lower than a third predetermined threshold;

(j) receiving identifying information of a web page to be classified by the trained classification model;

(k) classifying the web page using the trained classification model to determine whether the web page is a member of the class of interest; and (l) transmitting information indicating whether the web page is a member of the class of interest to an advertiser, over the Internet, in response to receiving a request for classification information about the web page.

* * * * *